Aug. 18, 1931.  H. W. KRINER  1,819,424
GASOLINE PURIFIER
Filed Feb. 23, 1929  2 Sheets-Sheet 1

Inventor:
H. W. Kriner
By Monroe C. Miller
Attorney.

Aug. 18, 1931. H. W. KRINER 1,819,424
GASOLINE PURIFIER
Filed Feb. 23, 1929 2 Sheets-Sheet 2

Inventor:
H. W. Kriner
By Monroe E. Miller
Attorney.

Patented Aug. 18, 1931

1,819,424

UNITED STATES PATENT OFFICE

HERMAN WILLIAM KRINER, OF GREENSBORO, NORTH CAROLINA

GASOLINE PURIFIER

Application filed February 23, 1929. Serial No. 342,277.

The present invention relates to apparatus for purifying gasoline and other solvents, and aims to provide an apparatus of that character comprising a novel combination of tanks to provide a compact and efficient arrangement.

Another object of the invention is the provision of a group of tanks connected in series wherein one tank houses the others, and provisions being made for draining and venting the several tanks.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
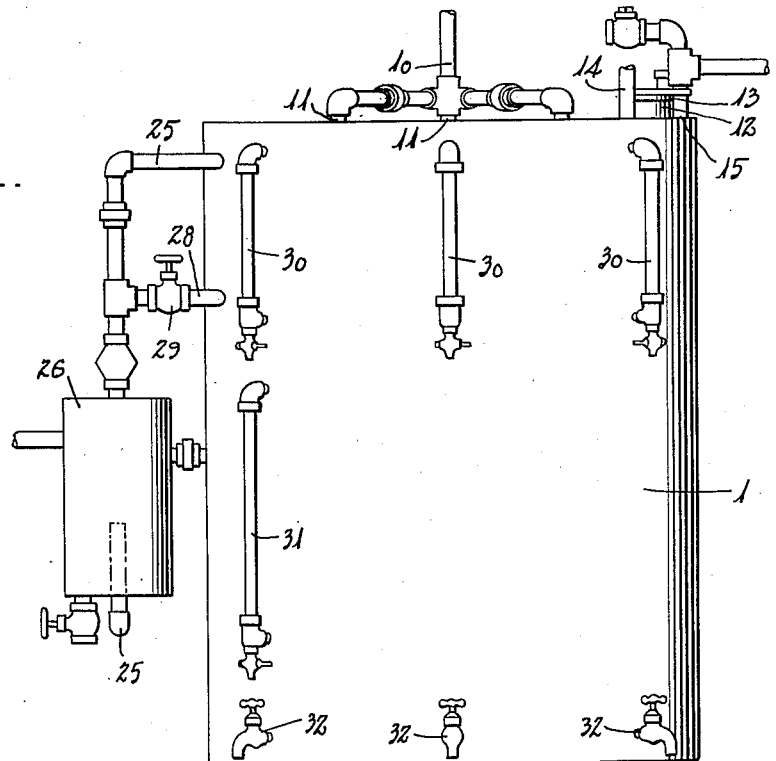
Figure 1 is a side elevation of the improved apparatus.
Figure 2:
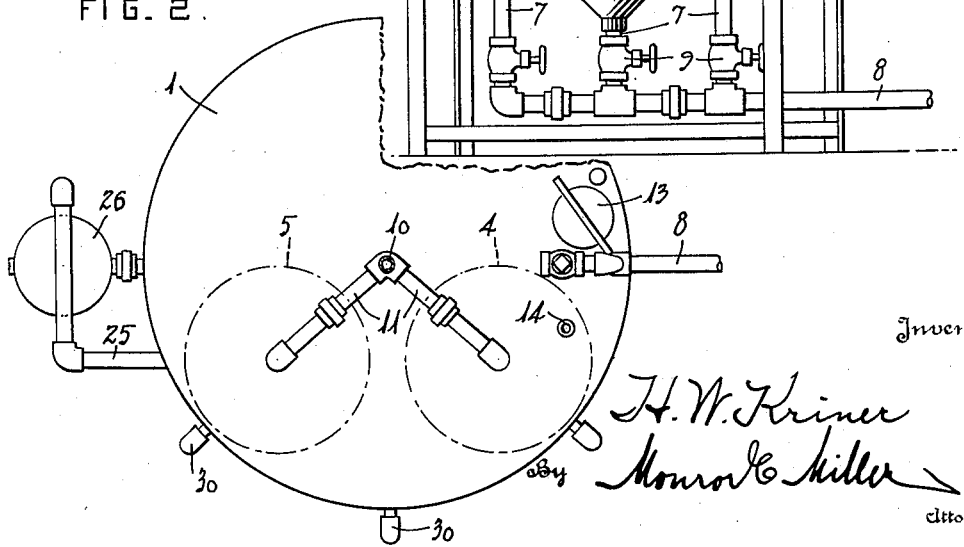
Fig. 2 is a plan view thereof, portions being broken away.
Figure 3:
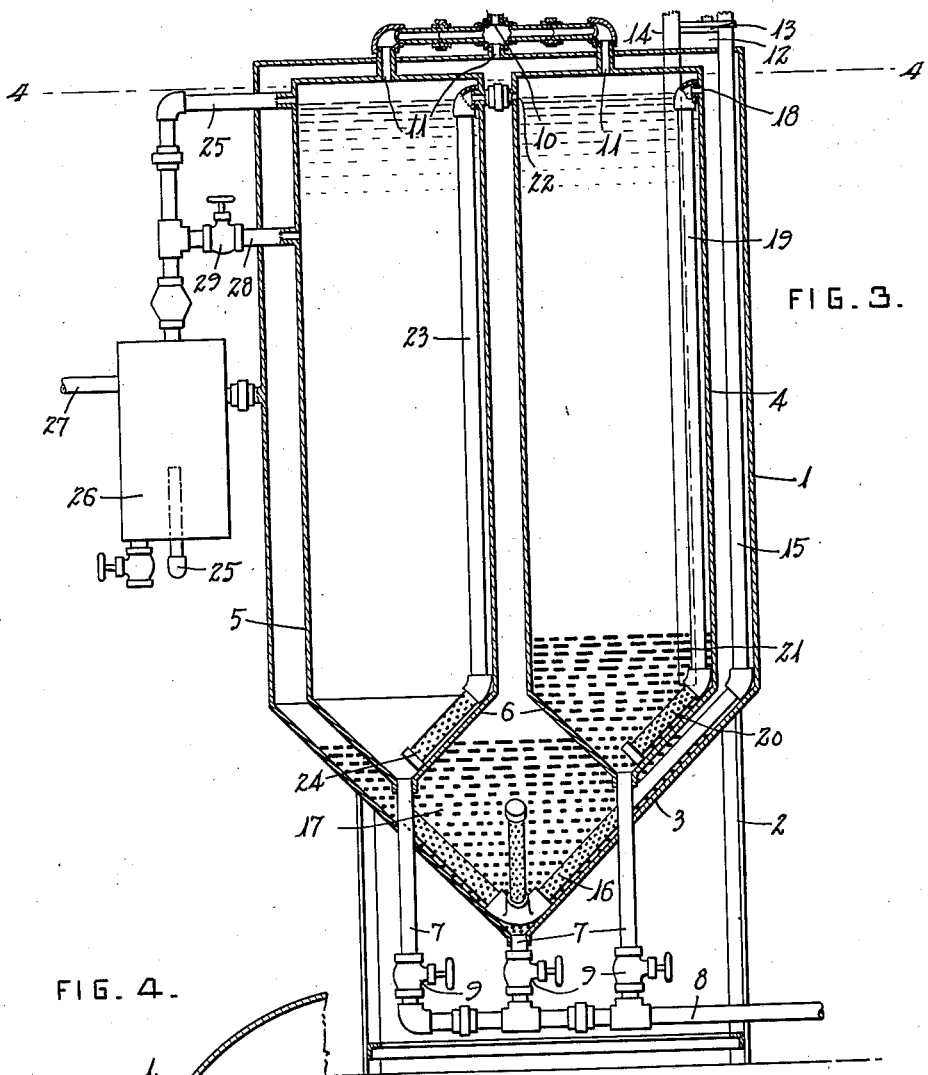
Fig. 3 is a vertical section substantially on the line 3—3 of Fig. 4.

A main tank 1 of suitable size is provided, which is preferably mounted on a stand 2, and said tank 1 has a funnel bottom 3.

Two smaller tanks 4 and 5 are disposed within the tank 1 and have funnel bottoms 6. Branches 7 of a drain pipe 8 are connected to the bottoms 3 and 6, and said branches have valves 9, in order that sediment may be drained from the tanks conveniently.

A vent pipe 10 has branches 11 connected to the tops of the three tanks, for the escape of air.

The top of the tank 1 has a filling neck 12 closed by a removable cover 13, and a filling pipe 14 extends downwardly into the tank 4 to a point within the bottom 6.

The gasoline or solvent is delivered into the tank 1 through a pipe 15 which has the apertured discharge portion 16 at the bottom of the tank submerged in a bed 17 of caustic soda and a decolorizing agent. The lower portion of the tank 1 also preferably contains water for rinsing or washing the solvent as it passes upwardly. The tank 4 has an inlet 18 in the wall thereof near its top for the overflow of solvent from the tank 1. A pipe 19 leads downwardly from the inlet 18 within the tank 4 and has a perforated discharge portion 20 at the bottom of the tank 4 and submerged in a bed 21 of soda or alcohol solution and water.

The tanks 4 and 5 have a connection 22 between the walls thereof near the tops of said tanks, for the overflow of the solvent from the tank 4 into the tank 5, and a pipe 23 leads downwardly from the connection 22 within the tank 5 and has a perforated discharge portion 24 at the bottom of said tank 5.

An overflow discharge pipe 25 is connected to the wall of the tank 5 near the top thereof and leads to a filter 26 mounted at the side of the tank 1, and the filtered solvent flows from the filter through the pipe 27.

A lower connection 28 is provided between the tank 5 and pipe 25 and has a valve 29 which may be opened for drawing off the solvent from the tank 5 above the level of the connection or by-pass 28.

Sight gages 30 are connected to all three tanks for indicating the level of the solvent therein, and a lower sight gage 31 is provided for the tank 5 to indicate lower levels of solvent therein and the condition of the solvent.

The three tanks also have drain cocks 32 immediately above their bottoms for drawing off the solvent from each tank.

The dirty solvent, after leaving the washers and passing into the trap (not shown) is pumped through the pipe 15 and discharged through the spray portion 16 into the bed 17 of caustic soda and a decolorizing agent.

The caustic soda or other alkali solution saponifies the grease and the decolorizing agent removes all color from the solvent. The combination of such actions with water forces speedy precipitation. The solvent rises in the tank 1 and overflows through the inlet 18 of the tank 4 from which the solvent flows down the pipe 19 and through the spray portion or nozzle 20. The solvent passes through the bed 21 of soda or alcohol solution and water to further purify the solvent, so that it is clean, soft and white when it overflows through the connection 22 into the tank 5. The solvent flows down through the pipe 23 and out through the spray nozzle 24 into the tank 5.

The solvent may overflow from the tank 5 through the pipe 25, and solvent may be drawn off through the connection 28 by opening the valve 29. The solvent then flows through the filter 26 and from the pipe 27 to the washers (not shown).

Figure 4:
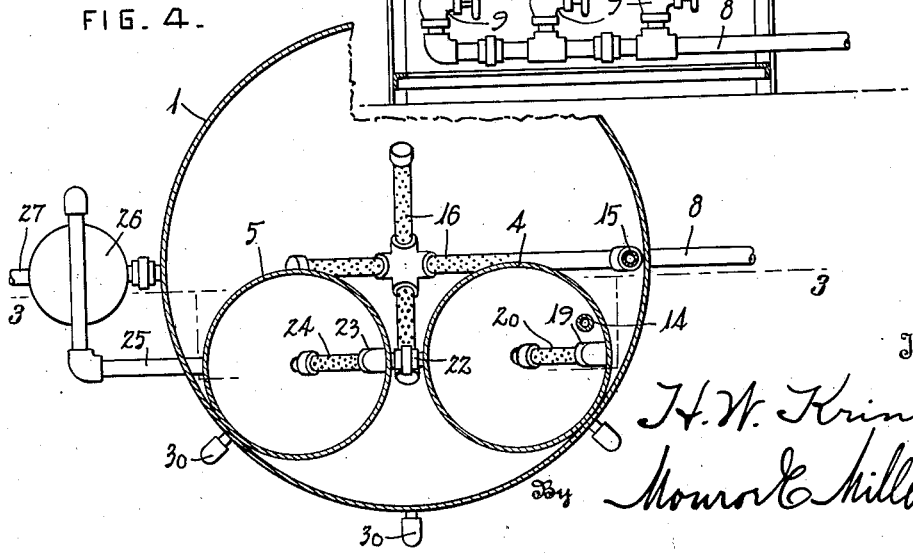
Fig. 4 is a horizontal section on the line 4—4 of Fig. 3.

The apparatus provides a compact unit for convenient use in dry cleaning establishments and other plants using gasoline or other solvents. The inner tanks 4 and 5 are tested before being secured in the outer tank 1, and the pipes leading from the inner tanks are welded or otherwise secured to the outer tank, thereby securely holding the inner tanks in place. Said inner tanks are disposed against the wall of the outer tank, as seen in Fig. 4.

Having thus described the invention, what is claimed as new is:

1. A solvent purifier comprising a main tank having a purifying agent therein and having an inlet at its upper end in communication with a supply of solvent, a pipe connected to said inlet and having a discharge opening near the lower end of said tank, a second tank housed in the main tank and having a purifying agent therein and having an inlet communicating with the upper portion of the main tank, a pipe connected to the inlet in said second tank and having a discharge opening near the lower end of said second tank, a third tank housed in the main tank and communicating with said second tank in its upper portion, and a filter supported by the main tank, said third tank having a plurality of communications with said filter whereby the solvent can be drawn off from the third tank at different levels.

2. A solvent purifier comprising a main tank having an inlet at its upper end in communication with a supply of solvent, a pipe connected to said inlet and having a discharge opening within said tank, a second tank housed in the main tank and having an inlet communicating with the upper portion of the main tank, a pipe connected to the inlet in said second tank and having a discharge opening within said second tank, a third tank housed in the main tank and communicating with said second tank in its upper portion, drain pipes connected to said second and third tanks at the bottoms thereof, and vent pipes connected to said second and third tanks at the tops thereof, said drain and vent pipes passing through the wall of the main tank and being secured to said wall.

In testimony whereof I hereunto affix my signature.

HERMAN WILLIAM KRINER.